United States Patent
Lin et al.

(10) Patent No.: US 8,373,984 B2
(45) Date of Patent: Feb. 12, 2013

(54) DOCKING STATION FOR CONNECTING A NOTEBOOK COMPUTER

(75) Inventors: Chun-Wang Lin, New Taipei (TW); Yu-Han Tsai, New Taipei (TW)

(73) Assignee: Wistron Corporation, New Taipei (TW)

( * ) Notice: Subject to any disclaimer, the term of this patent is extended or adjusted under 35 U.S.C. 154(b) by 144 days.

(21) Appl. No.: 13/102,055

(22) Filed: May 6, 2011

(65) Prior Publication Data
US 2011/0273838 A1  Nov. 10, 2011

(30) Foreign Application Priority Data
May 6, 2010 (TW) ............................. 99114504 A (51) Int. Cl.
*H05K 5/00* (2006.01)
*H05K 7/00* (2006.01)

(52) U.S. Cl. ......... 361/679.41; 361/679.42; 361/679.43; 361/679.44

(58) Field of Classification Search ............... 361/679.4, 361/679.41, 679.42, 679.43, 679.44
See application file for complete search history.

(56) References Cited

U.S. PATENT DOCUMENTS

| | | | |
|---|---|---|---|
| 6,741,462 B2 * | 5/2004 | Kamphuis et al. | 361/679.02 |
| 7,110,252 B2 | 9/2006 | Liang | |
| 7,633,750 B2 * | 12/2009 | Fan et al. | 361/679.43 |
| 7,800,897 B2 * | 9/2010 | Hung | 361/679.41 |
| 8,189,330 B2 * | 5/2012 | Hung et al. | 361/679.43 |
| 2007/0070598 A1 * | 3/2007 | Chuang | 361/686 |

FOREIGN PATENT DOCUMENTS

| | | |
|---|---|---|
| CN | 1920736 A | 2/2007 |
| TW | M249078 U | 11/2004 |

OTHER PUBLICATIONS

Office action mailed on Aug. 31, 2012 for the China application No. 201010170677.1, p. 3 line 4-31, p. 4 and p. 5 line 1-4.

* cited by examiner

*Primary Examiner* — Anthony Haughton
(74) *Attorney, Agent, or Firm* — Winston Hsu; Scott Margo (57) ABSTRACT

A docking station includes a connector, a first sliding component whereon a first incline and at least one incline are formed, and a second sliding component whereon a third incline is formed. When the second sliding component moves in a first direction so that the third incline slides relative to the first incline, the second sliding component pushes the first sliding component in a second direction for driving the connector to electrically connect with a notebook computer. The second sliding component further includes at least one protrusion. When the second sliding component moves in a third direction opposite to the first direction so that the protrusion slides relative to the second incline, the protrusion drives the first sliding component to move in a fourth direction opposite to the second direction so as to drive the connector to separate from the notebook computer.

16 Claims, 10 Drawing Sheets

DOCKING STATION FOR CONNECTING A NOTEBOOK COMPUTER

BACKGROUND OF THE INVENTION

1. Field of the Invention

The present invention relates to a docking station for connecting a notebook computer, and more particularly, to a docking station for disconnecting and connecting a notebook computer conveniently.

2. Description of the Prior Art

For expanding functions of a notebook computer in the market, a conventional docking station for docking with the notebook computer is available to provide various interfaces to connect to peripheral devices. The notebook computer can apply the peripheral devices as a desktop computer when connecting to the docking station, and the notebook computer can be a portable device when separating from the docking station. Due to a weight of the notebook computer and strength demand between the notebook computer and the docking station, many kinds of fixing mechanisms disposed on the docking station are utilized for connecting to or disconnecting from the notebook computer. However, the conventional connector of the docking station is designed to be fixed. A protrusion driven by a link is often used for pushing the notebook computer out so as to disconnect the notebook computer from the connector of the docking station. Such kind of design needs a force applied by the user larger than a resultant force of a connecting force between connectors and a weight of the notebook computer. Accordingly, it causes a great inconvenience on operation. Furthermore, the aforesaid mechanism is often more complicated and lacks for protecting mechanism of the connector. Accordingly, when disconnecting the notebook computer from the docking station, the connector protruding from a surface of the docking station might be damaged due to collision. Thus, design of a docking station for the notebook computer with simple structure and fool-proof protection is an important issue in the mechanism design of the notebook computer industry.

SUMMARY OF THE INVENTION

The present invention provides a docking station for disconnecting and connecting a notebook computer conveniently for solving above drawbacks.

According to the claimed invention, a docking station for connecting a notebook computer includes a supporting frame for supporting the notebook computer. A hole is disposed on the supporting frame. The docking station further includes a connector installed inside the hole on the supporting frame in a movable manner for electrically connecting to the notebook computer, and a first sliding component connected to the connector. A first incline and at least one second incline are formed on the first sliding component, and an inclined direction of the first incline is parallel to an inclined direction of the second incline. The docking station further includes a second sliding component combined with the first sliding component. A third incline is formed on the second sliding component and installed on a side of the first incline. The second incline pushes the first incline in a second direction so as to drive the connector to electrically connect with the notebook computer when the second sliding component moves in a first direction so that the third incline slides relative to the first incline. The second sliding component includes at least one protrusion, and the protrusion drives the first sliding component to move in a forth direction opposite to the second direction so as to drive the connector to depart from the notebook computer when the second sliding component moves in a third direction opposite to the first direction so that the protrusion slides relative to the second incline.

According to the claimed invention, the docking station further includes a link, and an end of the link is connected to the second sliding component. The docking station further includes a pushing lever connected to the other end of the link, for pushing the link so as to drive the second sliding component to move in the first direction or in the third direction.

According to the claimed invention, the docking station further includes a stopper, and an end of the stopper protrudes from the supporting frame. The stopper departs from the pushing lever when the notebook computer presses the end of the stopper, and the stopper stops the pushing lever when the notebook computer does not press the end of the stopper.

According to the claimed invention, at least one hollow pin is formed on the first sliding component, and the docking station further includes at least one guide pin disposed on an inner side of the supporting frame and installed inside the hollow pin, so as to constrain the first sliding component to move in the second direction or in the forth direction.

According to the claimed invention, at least one sliding slot is formed on the second sliding component, and the docking station further includes at least one pin installed on an inner side of the supporting frame, so as to constrain the sliding slot on the second sliding component to move in the first direction or in the third direction.

According to the claimed invention, the docking station further includes a hook, and an end of the hook protrudes from the supporting frame. The second sliding component pushes the other end of the hook so that the end of the hook engages inside a groove of the notebook computer. The docking station further includes a resilient component connected to the hook, and the resilient component drives the hook to recover to an original position when the end of the hook does not engage inside the groove of the notebook computer.

According to the claimed invention, the docking station further includes a grounding component, and an end of the grounding component protrudes from the supporting frame for contacting the notebook computer so as to ground the notebook computer.

According to the claimed invention, at least one guiding structure is formed on the first sliding component and disposed on a side of the first incline and on an end of the second incline, and the guiding structure is for guiding the protrusion to slide into the end of the second incline.

According to the claimed invention, a notebook computer system includes a notebook computer, and a plugging connector is disposed on a bottom side of the notebook computer. The notebook computer system further includes a docking station for connecting and supporting the notebook computer. The docking station includes a supporting frame for supporting the notebook computer, and a hole is disposed on the supporting frame. The docking station further includes a connector installed inside the hole on the supporting frame in a movable manner for electrically connecting to the plugging connector on the notebook computer, and a first sliding component connected to the connector. A first incline and at least one second incline are formed on the first sliding component, and an inclined direction of the first incline is parallel to an inclined direction of the second incline. The docking station further includes a second sliding component combined with the first sliding component, and a third incline is formed on the second sliding component and installed on a side of the first incline. The second incline pushes the first incline in a second direction so as to drive the connector to electrically connect with the plugging connector on the notebook computer when the second sliding component moves in a first direction so that the third incline slides relative to the first incline. The second sliding component includes at least one protrusion, and the protrusion drives the first sliding component to move in a forth direction opposite to the second direction so as to drive the connector to depart from the notebook computer when the second sliding component moves in a third direction opposite to the first direction so that the protrusion slides relative to the second incline.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
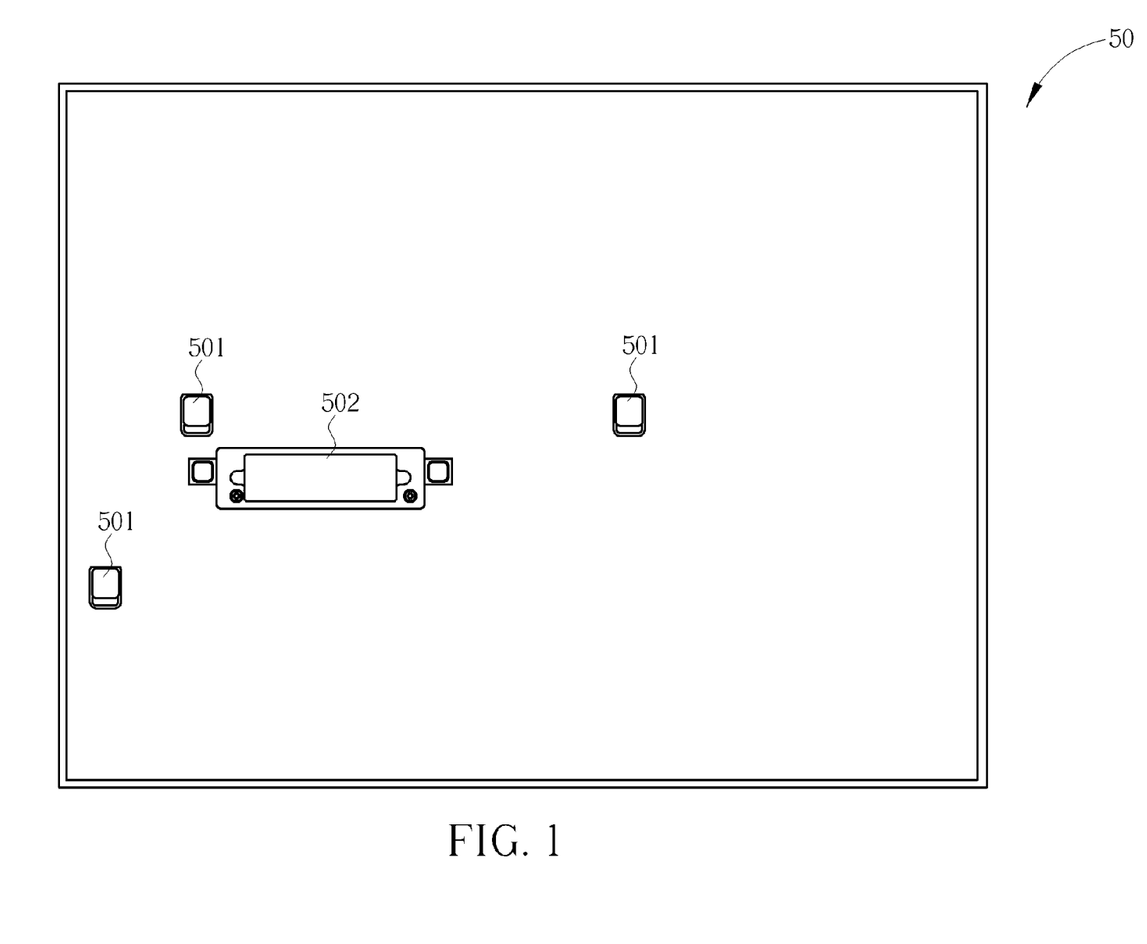
FIG. 1 is a bottom view of a notebook computer of a notebook computer system according to a preferred embodiment of the present invention.
Figure 2:
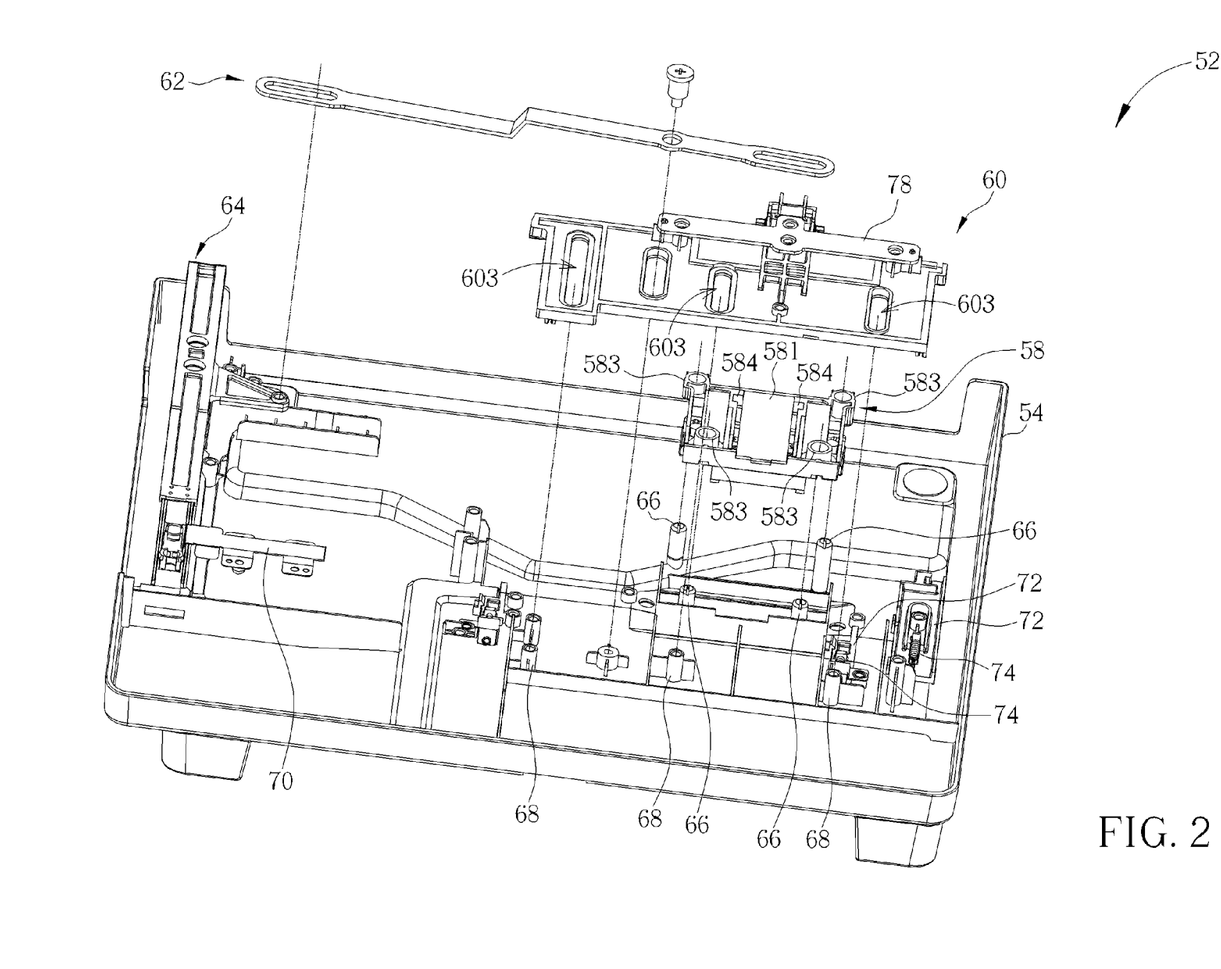
FIG. 2 is an exploded diagram of a docking station of the notebook computer system according to the preferred embodiment of the present invention.
Figure 3:
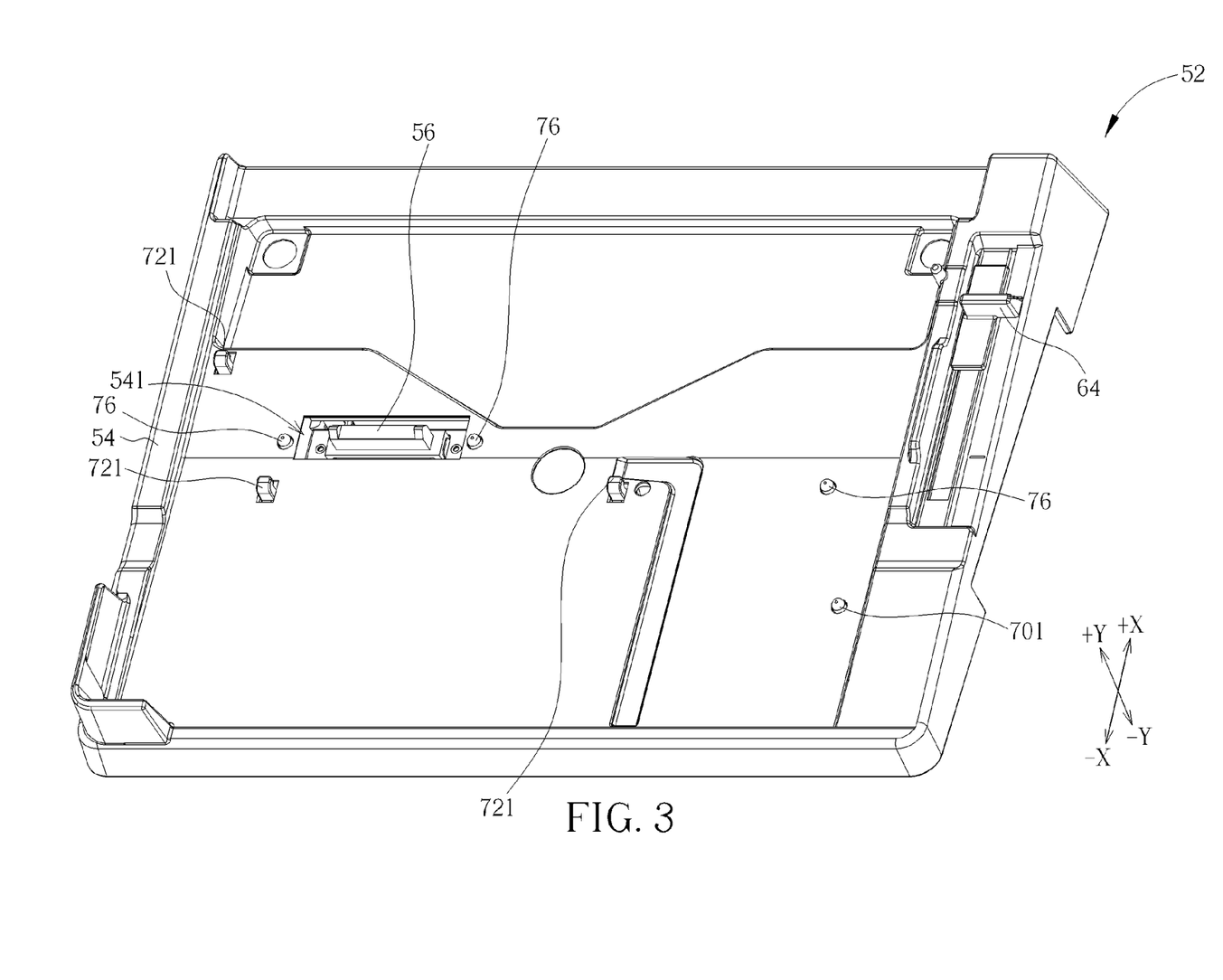
FIG. 3 is a perspective drawing shown that the docking station has not been combined with the notebook computer according to the preferred embodiment of the present invention.
Figure 4:
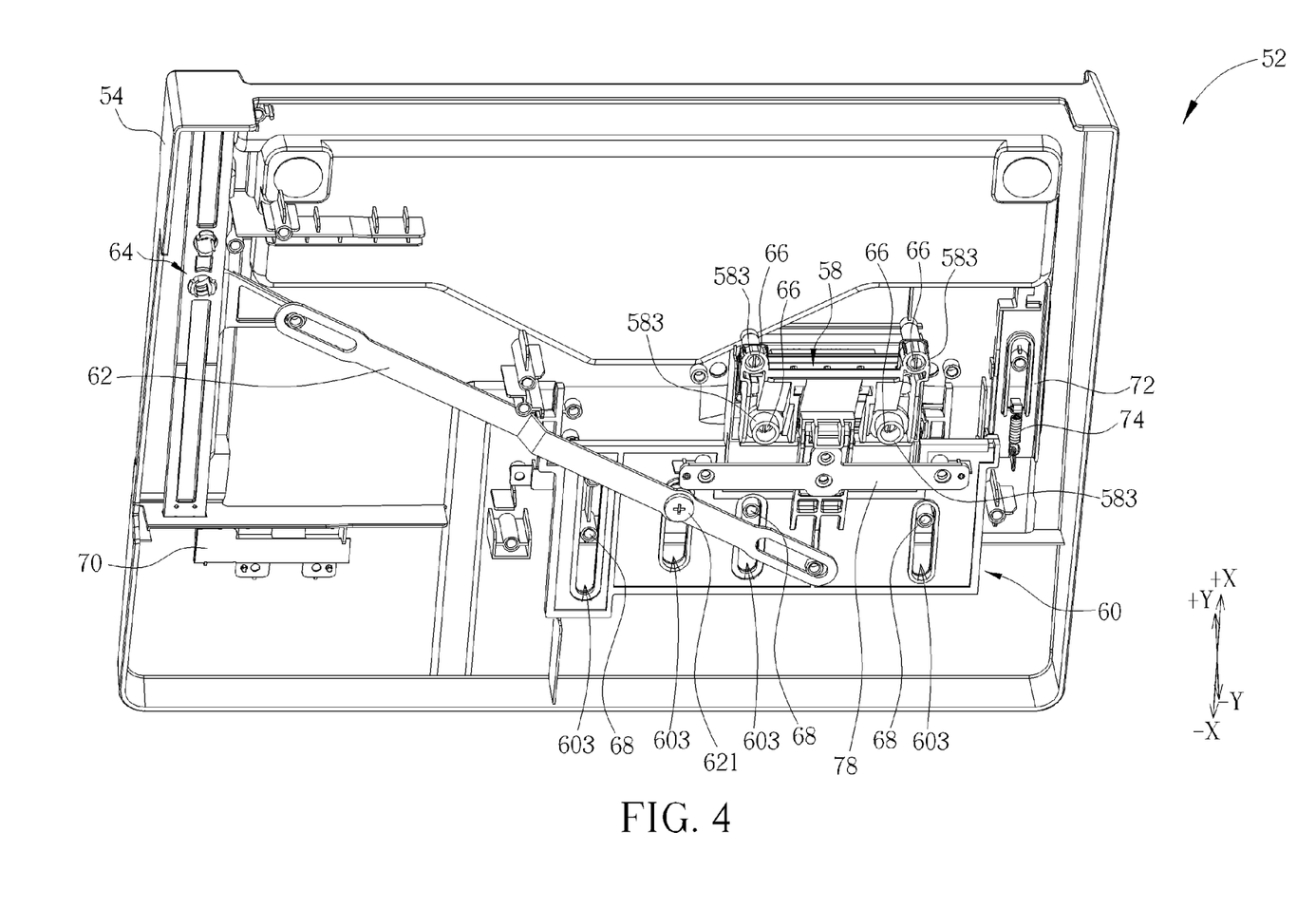
FIG. 4 is an internal structural diagram shown that the docking station has not been combined with the notebook computer according to the preferred embodiment of the present invention.
Figure 5:
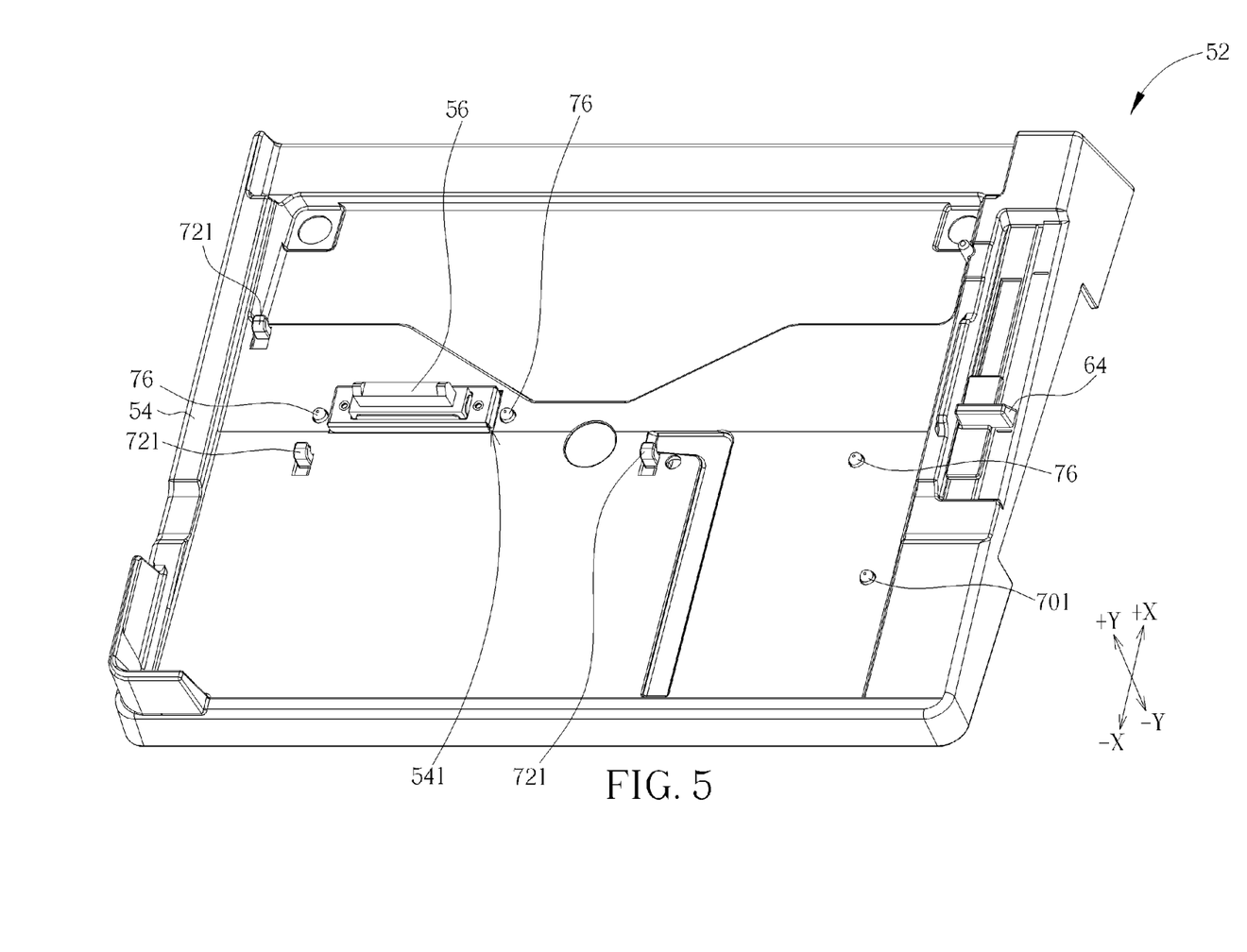
FIG. 5 is a perspective drawing shown that the docking station has been combined with the notebook computer according to the preferred embodiment of the present invention.
Figure 6:
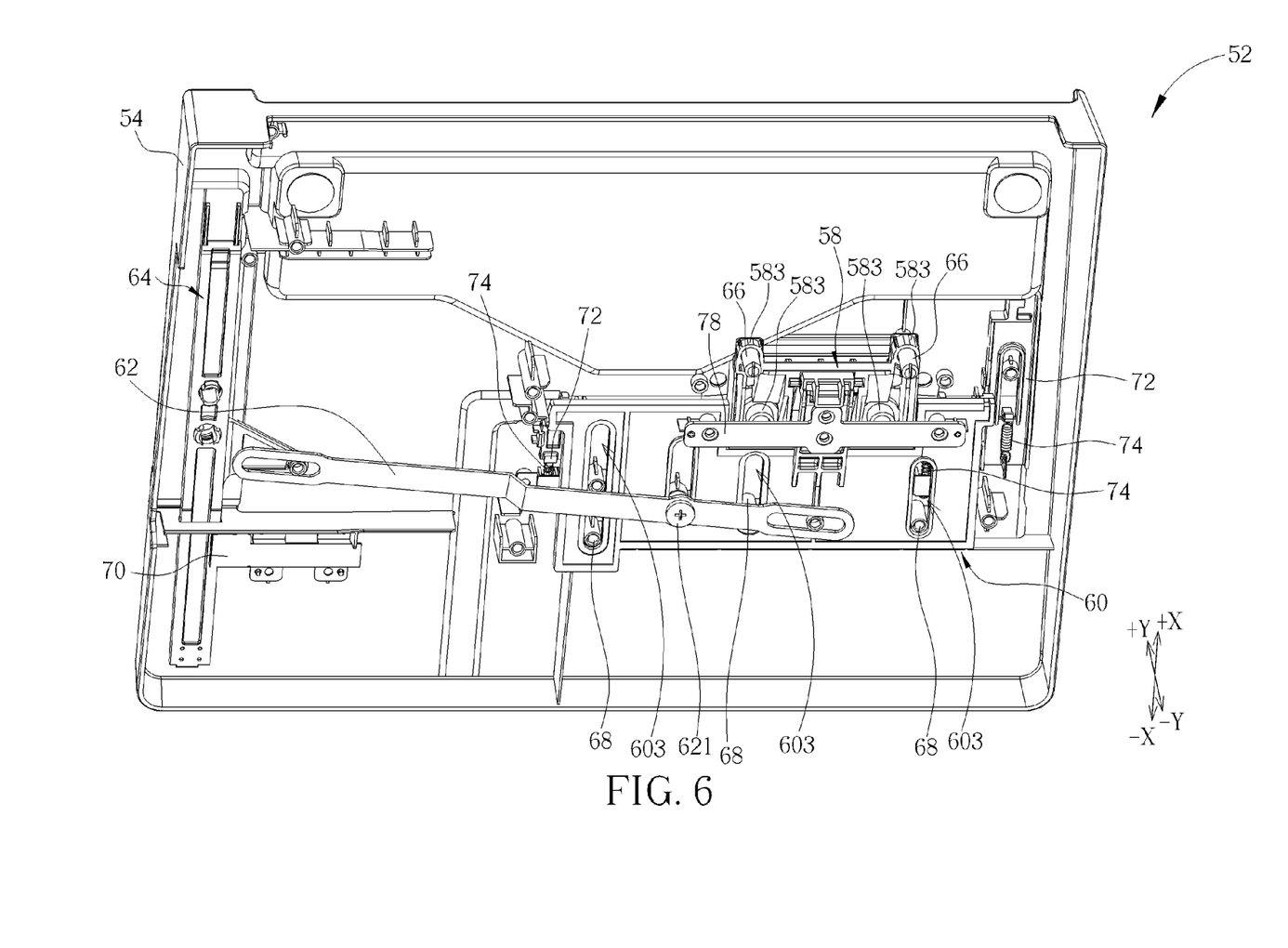
FIG. 6 is an internal structural diagram shown that the docking station has been combined with the notebook computer according to the preferred embodiment of the present invention.

Please refer to FIG. 1 to FIG. 6. FIG. 1 is a bottom view of a notebook computer 50 of a notebook computer system according to a preferred embodiment of the present invention. FIG. 2 is an exploded diagram of a docking station 52 of the notebook computer system according to the preferred embodiment of the present invention. FIG. 3 and FIG. 4 are a perspective drawing and an internal structural view respectively shown that the docking station 52 has not been combined with the notebook computer 50 according to the preferred embodiment of the present invention. FIG. 5 and FIG. 6 are a perspective drawing and an internal structural view respectively shown that the docking station 52 has been combined with the notebook computer 50 according to the preferred embodiment of the present invention. The docking station 52 is available to provide various interfaces to connect to peripheral devices so as to expand functions of the notebook computer 50. At least one groove 501 and a plugging connector 502 are disposed on a bottom side of the notebook computer 50. The docking station 52 includes a supporting frame 54 for supporting the notebook computer 50, and a hole 541 is disposed on the supporting frame 54. The docking station 52 further includes a connector 56 installed inside the hole 541 on the supporting frame 54 in a movable manner. The connector 56 is for electrically connecting to the plugging connector 502 on the notebook computer 50, so as to provide a data transmission interface between the docking station 52 and the notebook computer 50.

The docking station 52 further includes a first sliding component 58, a second sliding component 60, a link 62, and a pushing lever 64. The first sliding component 58 is connected to the connector 56, and the second sliding component 60 is combined with the first sliding component 58. An end of the link 62 is connected to the second sliding component 60, and the pushing lever 64 is connected to the other end of the link 62. The pushing lever 64 is for pushing the link 62, so that the link 62 can rotate relative to a fulcrum 621 so as to drive the second sliding component 60 to move in a +X direction (a first direction) or in a −X direction (a third direction opposite to the first direction). Since a distance between the end of the pushing lever 64 to which the link 62 is connected and the fulcrum 621 is larger than a distance between the end of the second sliding component 60 to which the link 62 is connected and the fulcrum 621, it can provide a longer force arm for a position where the pushing lever 64 is pushed. Accordingly, a user can easily push the pushing lever 64 to drive the second sliding component 60.

Figure 7:
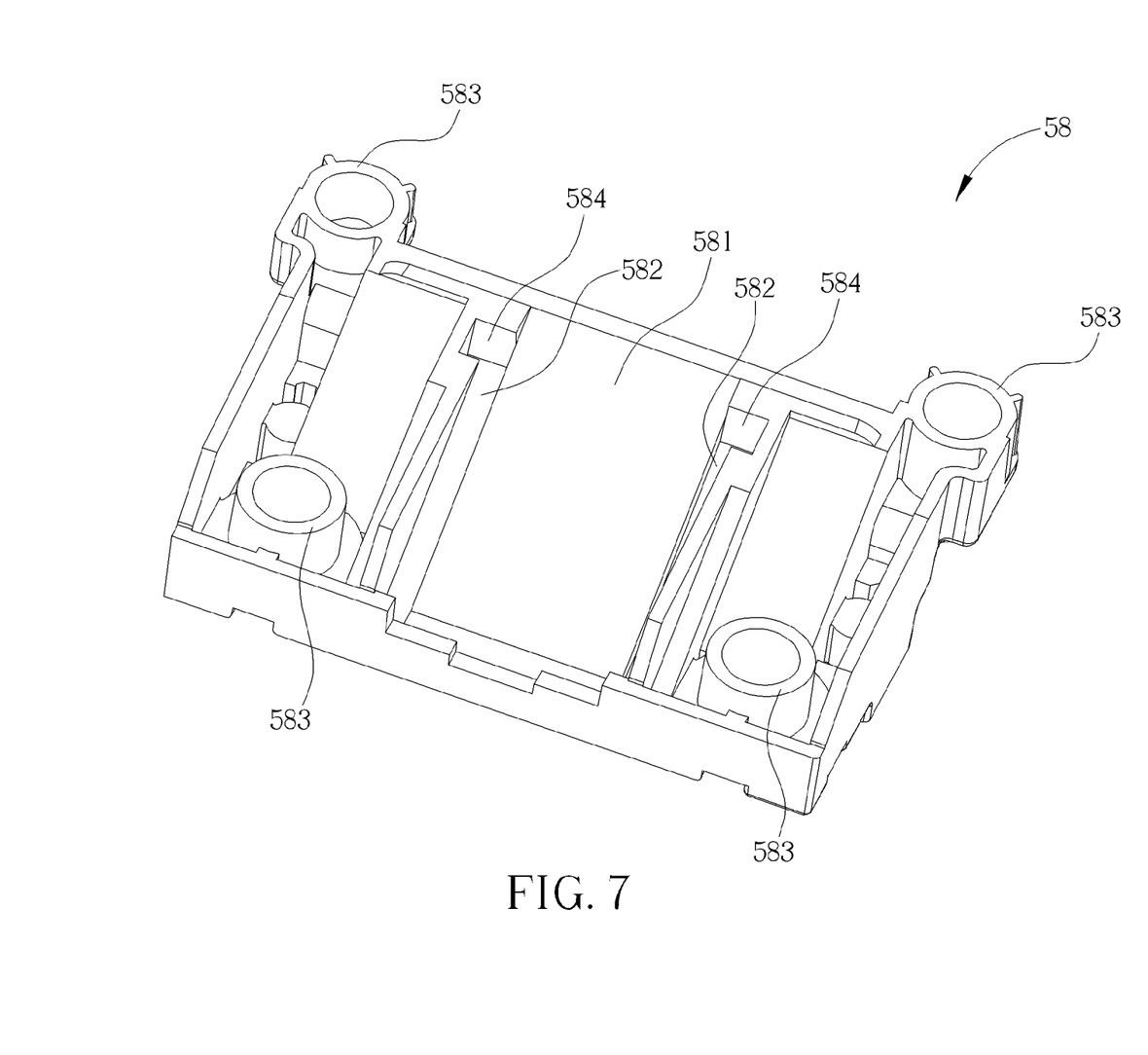
FIG. 7 and FIG. 8 are enlarged diagrams of a first sliding component in different views according to the preferred embodiment of the present invention.
Figure 8:
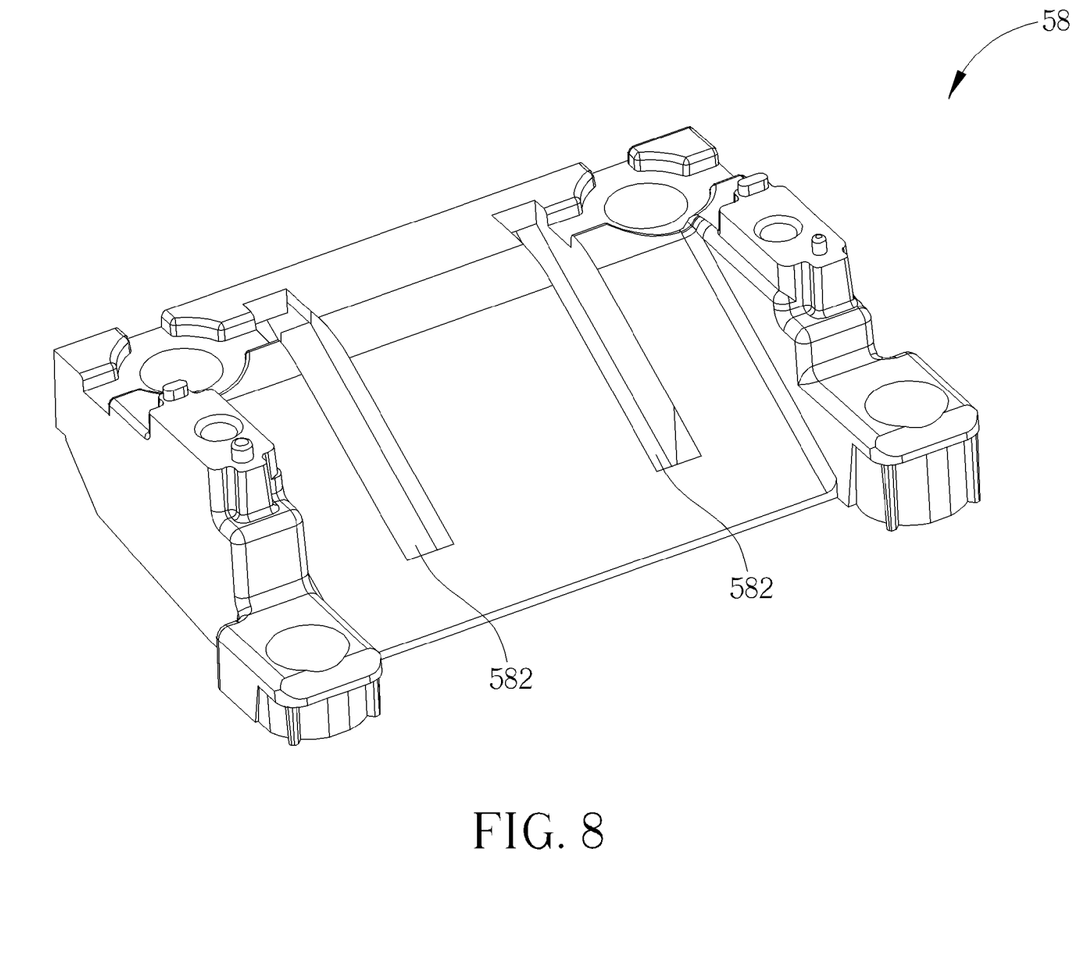
Figure 9:
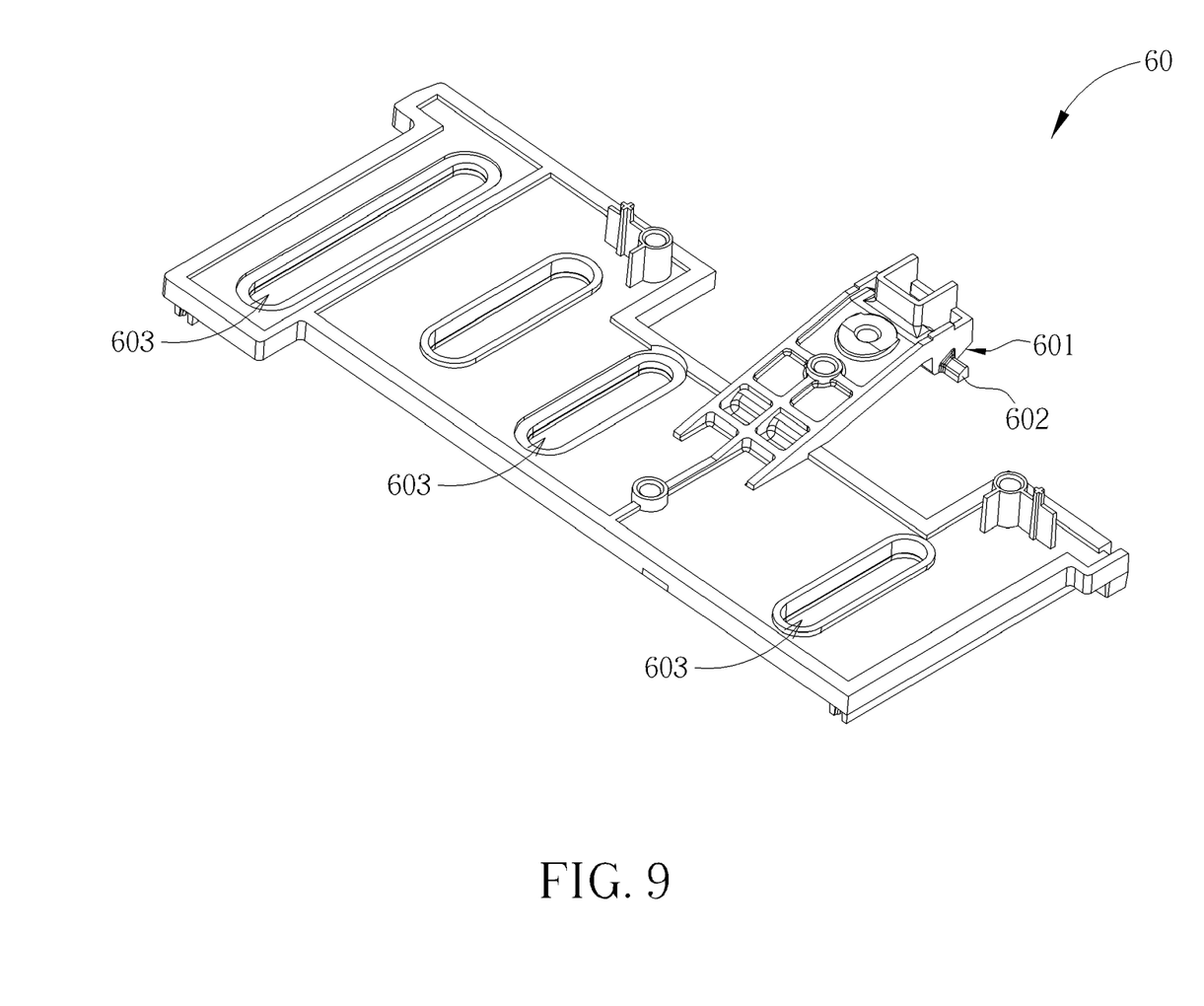
FIG. 9 and FIG. 10 are enlarged diagrams of a second sliding component in different views according to the preferred embodiment of the present invention.
Figure 10:
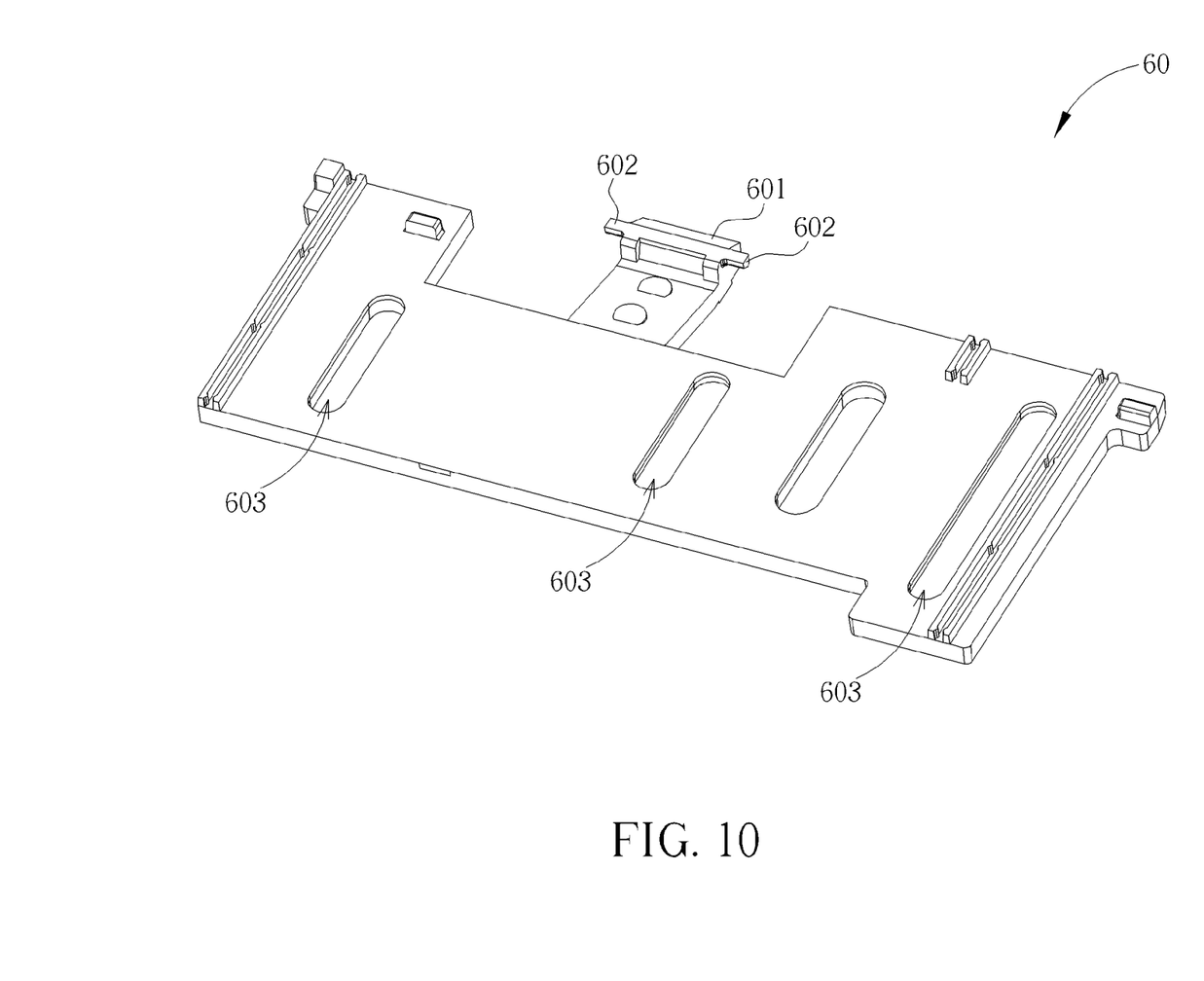

Please refer to FIG. 7 to FIG. 10. FIG. 7 and FIG. 8 are enlarged diagrams of the first sliding component 58 in different views according to the preferred embodiment of the present invention. FIG. 9 and FIG. 10 are enlarged diagrams of the second sliding component 60 in different views according to the preferred embodiment of the present invention. A first incline 581 and at least one second incline 582 are formed on the first sliding component 58. In this embodiment, the first sliding component 58 has two second inclines 582 respectively disposed on both sides of the first incline 581. An inclined direction of the first incline 581 is parallel to an inclined direction of the second incline 582. Furthermore, at least one hollow pin 583 and two guiding structures 584 are formed on the first sliding component 58. The two guiding structures 584 are disposed on both sides of the first incline 581 and on an end of the two second inclines 582. A third incline 601, which is formed on the second sliding component 60, is installed on a side of the first incline 581 of the first sliding component 58. Please refer to FIG. 3 to FIG. 9. As shown in FIG. 3 and FIG. 4, when the docking station 52 is not combined with the notebook computer 50 in an initial status, the connector 56 of the docking station 52 is located at a lower position so as to prevent the connector 56 from damaging due to collision. When the notebook computer 50 is going to be connected to the docking station 52, the pushing lever 64 can be pushed from a position shown in FIG. 4 to a position shown in FIG. 6. In the meanwhile, the pushing lever 64 brings the link 62 to rotate relative to the fulcrum 621, so as to drive the second sliding component 60 to move in the +X direction. During the movement of the second sliding component 60 in the +X direction, the third incline 601 of the second sliding component 60 slides relative to the first incline 581 of the first sliding component 58, so that the second sliding component 60 pushes the first sliding component 58 to move in a +Y direction (a second direction). The X direction can be substantially perpendicular to the Y direction. In other words, the X direction is perpendicular to an assembly direction of the docking station 52 and the notebook computer 50, and the Y direction is parallel to the assembly direction of the docking station 52 and the notebook computer 50. Accordingly, the connector 56 on the docking station 52 can be lifted as shown in FIG. 5, so as to drive the connector 56 to be electrically connected to the plugging connector 502 on the notebook computer 50.

On the contrary, when the notebook computer 50 is going to be disconnected from the docking station 52, the pushing lever 64 can be pushed from the position shown in FIG. 6 to the position shown in FIG. 4. In the meanwhile, the pushing lever 64 brings the link 62 to rotate relative to the fulcrum 621, so as to drive the second sliding component 60 to move in the −X direction. In order to overcome a resultant force of a connecting force between the connector 56 on the docking station 52 and the plugging connector 502 on the notebook computer 50 and a weight of the notebook computer 50, in addition to the link 62 for reducing the force applied by a user, the second sliding component 60 includes at least one protrusion 602. In this embodiment, the second sliding component 60 has two protrusions 602 respectively disposed on both sides of the first incline 581 and located in a position corresponding to the two second inclines 582 of the first sliding component 58. The two guiding structures 584 can guide the two protrusions 602 to be inserted into an end of the two second inclines 582, respectively. During the movement of the second sliding component 60 in the −X direction, the protrusion 602 slides relative to the second incline 582. By a relative movement of the protrusion 602 and the second incline 582, it can drive the first sliding component 58 to move in a −Y direction (a fourth direction opposite to the second direction). Accordingly, the connector 56 on the docking station 52 can sink to the initial position, so as to drive the connector 56 to disconnect from the plugging connector 502 on the notebook computer 50. Then, the user can remove the notebook computer 50 from the docking station 52.

Furthermore, in order to assist the first sliding component 58 in moving in the +Y direction (the second direction) and the −Y direction (the fourth direction) precisely, the docking station 52 further includes at least one guide pin 66. The guide pin 66 is disposed on an inner side of the supporting frame 54 and installed inside the hollow pin 583 of the first sliding component 58. The guide pin 66 combined with the hollow pin 583 can constrain the first sliding component 58 to move in the ±Y direction. In addition, for assisting the second sliding component 60 in moving in the +X direction (the first direction) and the −X direction (the third direction) precisely, at least one sliding slot 603 is formed on the second sliding component 60. The docking station 52 further includes at least one pin 68 disposed on an inner side of the supporting frame 54. The sliding slot 603 combined with the pin 68 can constrain the second sliding component 60 to move in the ±X direction. The aforesaid guiding structures can be replaced by other structures such as constraining walls for constraining the first sliding component 58 or the second sliding component 60, depending on practical application.

In order to prevent from pushing the pushing lever 64 to lift the connector 56 of the docking station 52 when the notebook 50 is not combined with the docking station 52, the docking station further includes a stopper 70. A protruding end 701 of the stopper 70 protrudes from the supporting frame 54. When the notebook computer 50 combined with the docking station 52 presses the protruding end 701 of the stopper 70, the stopper 70 departs from the pushing lever 64. In the meanwhile, the pushing lever 64 can be pushed to actuate the aforesaid mechanism to drive the connector 56. When the notebook computer 50 departing from the docking station 52 does not press the protruding end 701 of the stopper 70, the stopper 70 stops the pushing lever 64. In the meanwhile, the pushing lever 64 can not be pushed so as to provide a protecting mechanism of the connector 56. Moreover, in order to assist the combination between the docking station 52 and the notebook computer 50, the docking station 52 further includes at least one hook 72, an engaging end 721 of the hook 72 protrudes from the supporting frame 54. While the pushing lever 64 is pushed from the position shown in FIG. 4 to the position shown in FIG. 6, the second sliding component 60 moves in the +X direction. In the meanwhile, the second sliding component 60 can push the other end of the hook 72, so that the engaging end 721 of the hook 72 engages inside the groove 501 of the notebook computer 50. The docking station 52 further includes at least one resilient component 74 which is connected to the hook 72. The resilient component 74 is for driving the hook 72 to recover to an original position when the notebook computer 50 departs from the docking station 52 and the engaging end 721 of the hook 72 does not engage inside the groove 501 of the notebook computer 50. The resilient component 74 can be a spring. The docking station 52 further includes at least one grounding component 76. An end of the grounding component 76 protrudes from the supporting frame 54 for contacting the notebook computer 50 so as to ground the notebook computer 50. The grounding component 76 can be a clip. A metal dome can be disposed on an end of the grounding component 76 and protrudes from the supporting frame 54. Furthermore, as the second sliding component 60 is made of plastic, for the sake of enhancing structure strength of the second sliding component 60, a metal part 78 can be locked on the second sliding component 60 so as to be an enhancing structure of the second sliding component 60. The metal part 78 can be disposed selectively.

Compared to the prior art, the present invention provides the fixing mechanism with simple assembly and safety protection for docking the notebook computer on the docking station, so as to greatly reduce the operation force during operation. Furthermore, since the connector on the docking station is a movable design, it can improve the drawback in the prior art that the connector might be damaged due to the collision when the notebook disconnects from the docking station, such that a labor-saving mechanism and a protection mechanism can be achieved.

Those skilled in the art will readily observe that numerous modifications and alterations of the device and method may be made while retaining the teachings of the invention.

What is claimed is:

1. A docking station for connecting a notebook computer, comprising:
   a supporting frame for supporting the notebook computer, a hole being disposed on the supporting frame;
   a connector installed inside the hole on the supporting frame in a movable manner for electrically connecting to the notebook computer;
   a first sliding component connected to the connector, a first incline and at least one second incline being formed on the first sliding component, and an inclined direction of the first incline being parallel to an inclined direction of the second incline; and
   a second sliding component combined with the first sliding component, a third incline being formed on the second sliding component and installed on a side of the first incline, the second incline pushing the first incline in a second direction so as to drive the connector to electrically connect with the notebook computer when the second sliding component moves in a first direction so that the third incline slides relative to the first incline, the second sliding component comprising at least one protrusion, and the protrusion driving the first sliding component to move in a forth direction opposite to the second direction so as to drive the connector to depart from the notebook computer when the second sliding component moves in a third direction opposite to the first direction so that the protrusion slides relative to the second incline.

2. The docking station of claim 1, further comprising:
a link, an end of the link being connected to the second sliding component; and
a pushing lever connected to the other end of the link, for pushing the link so as to drive the second sliding component to move in the first direction or in the third direction.

3. The docking station of claim 2, further comprising a stopper, an end of the stopper protruding from the supporting frame, the stopper departing from the pushing lever when the notebook computer presses the end of the stopper, and the stopper stopping the pushing lever when the notebook computer does not press the end of the stopper.

4. The docking station of claim 1, wherein at least one hollow pin is formed on the first sliding component, and the docking station further comprises at least one guide pin disposed on an inner side of the supporting frame and installed inside the hollow pin, so as to constrain the first sliding component to move in the second direction or in the forth direction.

5. The docking station of claim 1, wherein at least one sliding slot is formed on the second sliding component, and the docking station further comprises at least one pin installed on an inner side of the supporting frame, so as to constrain the sliding slot on the second sliding component to move in the first direction or in the third direction.

6. The docking station of claim 1, further comprising:
a hook, an end of the hook protruding from the supporting frame, the second sliding component being for pushing the other end of the hook so that the end of the hook engages inside a groove of the notebook computer; and
a resilient component connected to the hook, the resilient component driving the hook to recover to an original position when the end of the hook does not engage inside the groove of the notebook computer.

7. The docking station of claim 1, further comprising a grounding component, and an end of the grounding component protruding from the supporting frame for contacting the notebook computer so as to ground the notebook computer.

8. The docking station of claim 1, wherein at least one guiding structure is formed on the first sliding component and disposed on a side of the first incline and on an end of the second incline, and the guiding structure is for guiding the protrusion to slide into the end of the second incline.

9. A notebook computer system, comprising:
a notebook computer, a plugging connector being disposed on a bottom side of the notebook computer; and
a docking station for connecting and supporting the notebook computer, comprising:
a supporting frame for supporting the notebook computer, a hole being disposed on the supporting frame;
a connector installed inside the hole on the supporting frame in a movable manner for electrically connecting to the plugging connector on the notebook computer;
a first sliding component connected to the connector, a first incline and at least one second incline being formed on the first sliding component, and an inclined direction of the first incline being parallel to an inclined direction of the second incline; and
a second sliding component combined with the first sliding component, a third incline being formed on the second sliding component and installed on a side of the first incline, the second incline pushing the first incline in a second direction so as to drive the connector to electrically connect with the plugging connector on the notebook computer when the second sliding component moves in a first direction so that the third incline slides relative to the first incline, the second sliding component comprising at least one protrusion, and the protrusion driving the first sliding component to move in a forth direction opposite to the second direction so as to drive the connector to depart from the notebook computer when the second sliding component moves in a third direction opposite to the first direction so that the protrusion slides relative to the second incline.

10. The notebook computer system of claim 9, wherein the docking station further comprising:
a link, an end of the link being connected to the second sliding component; and
a pushing lever connected to the other end of the link, for pushing the link so as to drive the second sliding component to move in the first direction or in the third direction.

11. The notebook computer system of claim 10, wherein the docking station further comprising a stopper, an end of the stopper protruding from the supporting frame, the stopper departing from the pushing lever when the notebook computer presses the end of the stopper, and the stopper stopping the pushing lever when the notebook computer does not press the end of the stopper.

12. The notebook computer system of claim 9, wherein at least one hollow pin is formed on the first sliding component, and the docking station further comprises at least one guide pin disposed on an inner side of the supporting frame and installed inside the hollow pin, so as to constrain the first sliding component to move in the second direction or in the forth direction.

13. The notebook computer system of claim 9, wherein at least one sliding slot is formed on the second sliding component, and the docking station further comprises at least one pin installed on an inner side of the supporting frame, so as to constrain the sliding slot on the second sliding component to move in the first direction or in the third direction.

14. The notebook computer system of claim 9, wherein the docking station further comprising:
a hook, an end of the hook protruding from the supporting frame, the second sliding component being for pushing the other end of the hook so that the end of the hook engages inside a groove of the notebook computer; and
a resilient component connected to the hook, the resilient component driving the hook to recover to an original position when the end of the hook does not engage inside the groove of the notebook computer.

15. The notebook computer system of claim 9, wherein the docking station further comprising a grounding component, and an end of the grounding component protruding from the supporting frame for contacting the notebook computer so as to ground the notebook computer.

16. The notebook computer system of claim 9, wherein at least one guiding structure is formed on the first sliding component and disposed on a side of the first incline and on an end of the second incline, and the guiding structure is for guiding the protrusion to slide into the end of the second incline.

* * * * *